United States Patent
Ota et al.

(10) Patent No.: US 10,260,621 B2
(45) Date of Patent: Apr. 16, 2019

(54) CONTROLLER FOR AUTOMATIC TRANSMISSION

(71) Applicant: TOYOTA JIDOSHA KABUSHIKI KAISHA, Toyota-shi, Aichi-ken (JP)

(72) Inventors: Keisuke Ota, Toyota (JP); Ayumu Sagawa, Toyota (JP); Tomoya Iwami, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 15/651,209

(22) Filed: Jul. 17, 2017

(65) Prior Publication Data

US 2018/0023689 A1    Jan. 25, 2018

(30) Foreign Application Priority Data

Jul. 20, 2016    (JP) .................................. 2016-142208

(51) Int. Cl.
  *F16H 61/04*    (2006.01)
  *F16H 59/70*    (2006.01)
  (Continued)

(52) U.S. Cl.
  CPC ........... *F16H 59/70* (2013.01); *F16H 61/061* (2013.01); *B60Y 2300/186* (2013.01); *F16H 2059/147* (2013.01); *F16H 2059/6807* (2013.01); *F16H 2059/6815* (2013.01); *F16H 2059/6884* (2013.01); *F16H 2059/6892* (2013.01); *F16H 2059/725* (2013.01); *F16H 2061/0492* (2013.01); *F16H 2061/064* (2013.01)

(58) Field of Classification Search
  CPC .. F16H 59/70; F16H 61/061; F16H 2059/725; F16H 2061/064; F16H 2059/147; F16H 2059/6815; F16H 2059/6884; F16H 2059/6892; F16H 2061/0492; F16H 2059/6807; B60Y 2300/186
  See application file for complete search history.

(56) References Cited

U.S. PATENT DOCUMENTS 6,270,444 B1 *   8/2001   Tsutsui ................ F16H 61/0437
                                                475/127
9,651,145 B1 *   5/2017   Fiore ................... F16H 61/0403
(Continued)

FOREIGN PATENT DOCUMENTS

JP    2000-110929 A    4/2000
JP    2009-079714 A    4/2009

*Primary Examiner* — David J Hlavka
(74) *Attorney, Agent, or Firm* — Oliff PLC

(57) ABSTRACT

When an input torque becomes greater by a predetermined value or more due to an operation of increasing an amount of accelerator depression amount or the like during a gear shift, a controller for an automatic transmission updates a target gear shift characteristic value to a target gear shift characteristic value which is set when the gear shift is started with the input torque based on the input torque at the updating time, and performs gear shift control from a degree of progress in gear shift at the updating time based on the updated target gear shift characteristic value. Since the target gear shift characteristic value can be changed with respect to an increase in the input torque during the gear shift by this control, it is possible to prevent a decrease in durability of frictional engagement elements.

2 Claims, 6 Drawing Sheets

(51) Int. Cl.
  *F16H 61/06* (2006.01)
  *F16H 59/68* (2006.01)
  *F16H 59/72* (2006.01)
  *F16H 59/14* (2006.01)

(56) References Cited

U.S. PATENT DOCUMENTS

2016/0084374 A1\* 3/2016 Kim ........................ F16H 61/68
  701/51
2017/0137021 A1\* 5/2017 Nefcy ................. F16H 61/0204

\* cited by examiner

FIG. 3

|   | C1 | C2 | C3 | C4 | B1 | B2 |
|---|----|----|----|----|----|----|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

CONTROLLER FOR AUTOMATIC TRANSMISSION

INCORPORATION BY REFERENCE

The disclosure of Japanese Patent Application No. 2016-142208 filed on Jul. 20, 2016 including the specification, drawings and abstract is incorporated herein by reference in its entirety.

BACKGROUND

1. Technical Field

The disclosure relates to a controller for an automatic transmission.

2. Description of Related Art

An example of a technique for taking generation of heat from frictional engagement elements into consideration in a stepped automatic transmission in which a plurality of shift stages are set by selectively causing a plurality of frictional engagement elements to engage with each other is described in Japanese Patent Application Publication No. 2009-79714 (JP 2009-79714 A)).

In the technique described in JP 2009-79714 A, a thermal load state of a friction element at a gear shift end time when a gear shift is performed in a first gear shift mode is predicted before the gear shift starts, and the gear shift is performed in a second gear shift mode in which an amount of heat generated is smaller than that in the first gear shift mode when the thermal load state of the friction element at the gear shift end time which has been predicted before the gear shift starts is a predetermined state.

SUMMARY

In the above-mentioned technique, the gear shift mode is switched based on the thermal load state of the friction element at the gear shift end time which has been predicted before the gear shift starts. Accordingly, when an input torque of the automatic transmission (hereinafter also referred to as an input torque) increases during a gear shift, an actual thermal load on the friction element changes by increasing from the thermal load of the friction element (hereinafter referred to as a thermal load) which has been predicted in the gear shift mode before the gear shift starts and there is concern that durability of the friction element (a frictional engagement element) will decrease.

The disclosure provides a controller that can prevent a decrease in durability of frictional engagement elements even when an input torque increases during a gear shift in a stepped automatic transmission including a plurality of frictional engagement elements.

According to the disclosure, there is provided a controller for an automatic transmission. The automatic transmission is a stepped automatic transmission in which a plurality of shift stages is set by selectively causing a plurality of frictional engagement elements to engage with each other. The controller includes an electronic control unit. The electronic control unit is configured to: i) perform gear shift control depending on a degree of progress in gear shift based on a target gear shift characteristic value corresponding to an input torque of the automatic transmission at a gear shift start time; ii) update the target gear shift characteristic value when the input torque becomes greater by a predetermined value or more than the input torque at the gear shift start time during the gear shift of the automatic transmission; iii) update the target gear shift characteristic value such that an updated target gear shift characteristic value is a target gear shift characteristic value which is set when the gear shift is started with the input torque at an updating time; and iv) perform gear shift control from the degree of progress in gear shift at the updating time based on the updated target gear shift characteristic value.

According to the disclosure, when the input torque becomes greater by a predetermined value or more than that at the gear shift start time due to an operation of increasing an amount of accelerator depression or the like during the gear shift, the target gear shift characteristic value is updated based on the input torque at that time, and the gear shift control is performed from the degree of progress in gear shift at the updating time based on the updated target gear shift characteristic value. Since the target gear shift characteristic value can be changed with respect to an increase in the input torque during the gear shift by this control, it is possible to decrease thermal loads of the frictional engagement elements. Accordingly, it is possible to prevent a decrease in durability of the frictional engagement elements.

In the disclosure, when the input torque becomes greater by the predetermined value or more than the input torque at the updating time after the target gear shift characteristic value has been updated during one instance of gear shift of the automatic transmission, the electronic control unit is configured to: v) re-update the target gear shift characteristic value; vi) set the target gear shift characteristic value to the target gear shift characteristic value which is set when the gear shift is started with the input torque at a re-updating time; and vii) perform gear shift control from the degree of progress in gear shift at the re-updating time based on a re-updated target gear shift characteristic value.

By performing this control, when the increase in the input torque during the gear shift is large, the target gear shift characteristic value is updated two or more times during one instance of gear shift. Accordingly, even when the increase in the input torque is large, it is possible to prevent an increase in thermal load of each frictional engagement element during the gear shift and to prevent a decrease in durability of the frictional engagement elements.

According to the disclosure, it is possible to prevent a decrease in durability of frictional engagement elements even when an input torque increases during a gear shift in a stepped automatic transmission including a plurality of frictional engagement elements.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an engagement table illustrating engagement states of first to fourth clutches, a first brake, and a second brake for each shift stage in the automatic transmission;

DETAILED DESCRIPTION OF EMBODIMENTS

Hereinafter, embodiments of the disclosure will be described with reference to the accompanying drawings.

First, a vehicle 100 according to this embodiment will be described below with reference to FIGS. 1 to 4.

Figure 1:
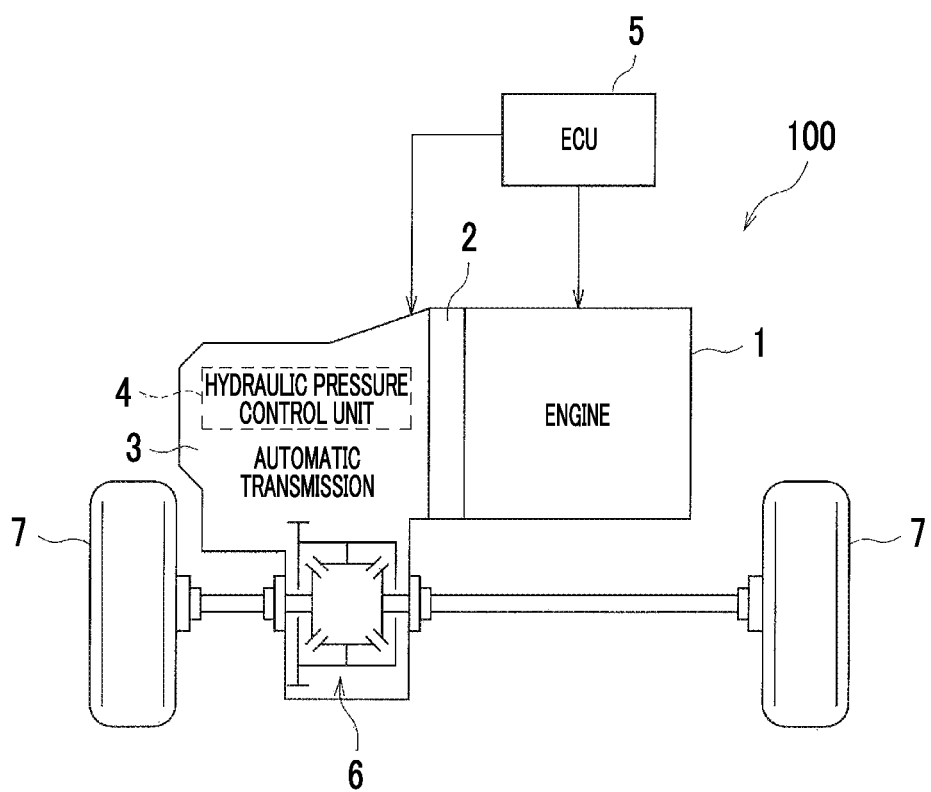
FIG. 1 is a diagram schematically illustrating a configuration of a vehicle equipped with an automatic transmission according to the disclosure.

As illustrated in FIG. 1, the vehicle 100 includes an engine 1, a torque converter 2, an automatic transmission 3, a hydraulic pressure control unit 4, and an electronic control unit (ECU) 5. The vehicle 100 is, for example, of a front engine-front drive (FF) type and is configured such that an output of the engine 1 is transmitted to a differential device 6 via the torque converter 2 and the automatic transmission 3 and is assigned to right and left driving wheels (front wheels) 7.

The engine (internal combustion engine) 1 is a driving force source for traveling and is, for example, a multi-cylinder gasoline engine. The engine 1 is configured such that an operation state thereof can be controlled based on a throttle opening level (an amount of intake air) of a throttle valve, an amount of fuel injected, an ignition timing, and the like.

Figure 2:
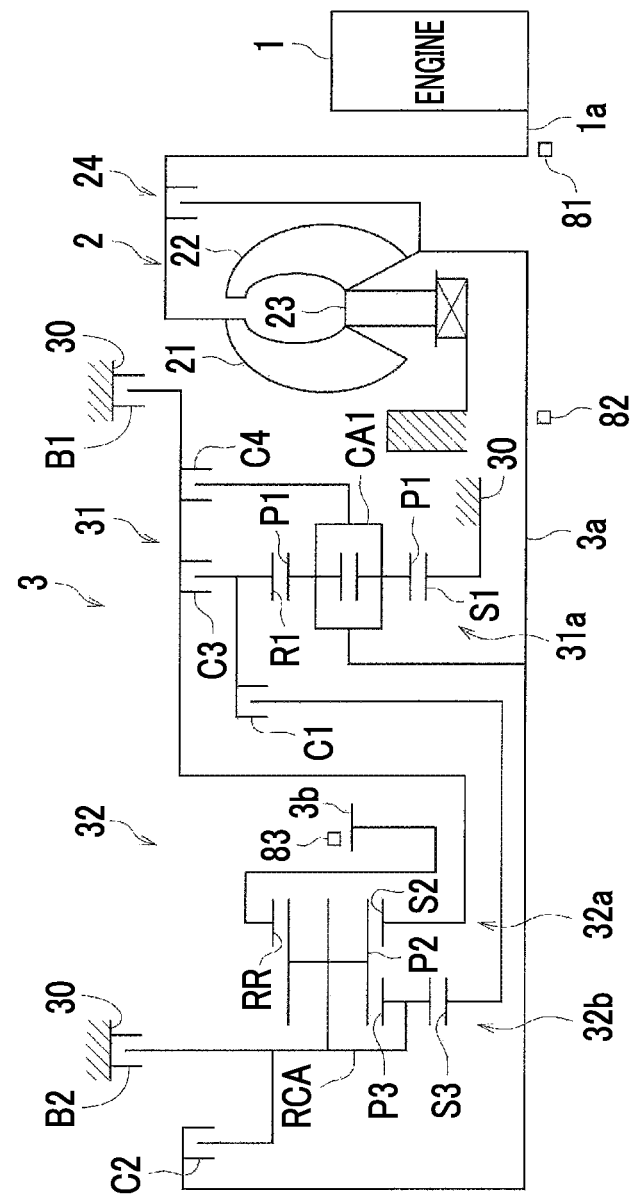
FIG. 2 is a skeleton diagram illustrating a configuration of a torque converter and the automatic transmission.

As illustrated in FIG. 2, the torque converter 2 includes a pump impeller 21, a turbine runner 22, a stator 23, and a lock-up clutch 24. The pump impeller 21 is connected to a crank shaft 1a which is an output shaft of the engine 1. The turbine runner 22 is connected to the automatic transmission 3. The stator 23 has a torque amplifying function. The lock-up clutch 24 is a clutch that directly connects the engine 1 and the automatic transmission 3 to each other. In FIG. 2, a lower half below a rotation axis of the torque converter 2 and the automatic transmission 3 is omitted and only an upper half is schematically illustrated.

The automatic transmission 3 is disposed in a power transmission path between the engine 1 and the driving wheels 7 and is configured to change rotation of an input shaft 3a and to output the changed rotation to an output shaft 3b. In the automatic transmission 3, the input shaft 3a is connected to the turbine runner 22 of the torque converter 2 and the output shaft 3b is connected to the driving wheels 7 via the differential device 6 or the like.

The automatic transmission 3 includes a first gear shift unit (a front planetary) 31, a second gear shift unit (a rear planetary) 32, first to fourth clutches C1 to C4, a first brake B1, and a second brake B2. The first gear shift unit 31 includes a first planetary gear mechanism 31a as a main element. The second gear shift unit 32 includes a second planetary gear mechanism 32a and a third planetary gear mechanism 32b as a main element.

The first planetary gear mechanism 31a constituting the first gear shift unit 31 is a double pinion type planetary gear mechanism. The first planetary gear mechanism 31a includes a sun gear S1, a plurality of pairs of pinion gears P1 that engage with each other, a planetary carrier CA1 that supports the pinion gears P1 such that they can rotate and revolve, and a ring gear R1 that engages with the sun gear S1 via the pinion gears P1.

The planetary carrier CA1 is connected to the input shaft 3a and integrally rotates along with the input shaft 3a. The sun gear S1 is fixed to a transmission case 30 and is not rotatable. The ring gear R1 serves as an intermediate output member and reduces a rotation speed of the input shaft 3a and transmits the reduced rotation speed to the second gear shift unit 32.

The second planetary gear mechanism 32a constituting the second gear shift unit 32 is a single pinion type planetary gear mechanism. The second planetary gear mechanism 32a includes a sun gear S2, a pinion gear P2, a planetary carrier RCA that supports the pinion gear P2 such that they can rotate and revolve, and a ring gear RR that engages with the sun gear S2 via the pinion gear P2.

The third planetary gear mechanism 32b constituting the second gear shift unit 32 is a double pinion type planetary gear mechanism. The third planetary gear mechanism 32b includes a sun gear S3, a plurality of pairs of pinion gears P2 and P3 that engage with each other, a planetary carrier RCA that supports the pinion gears P2 and P3 such that they can rotate and revolve, and a ring gear RR that engages with the sun gear S3 via the pinion gears P2 and P3. The planetary carrier RCA and the ring gear RR are shared by the second planetary gear mechanism 32a and the third planetary gear mechanism 32b.

The sun gear S2 is selectively connected to the transmission case 30 by the first brake B1. The sun gear S2 is selectively connected to the ring gear R1 via the third clutch C3. The sun gear S2 is further selectively connected to the planetary carrier CA1 via the fourth clutch C4. The sun gear S3 is selectively connected to the ring gear R1 via the first clutch C1. The planetary carrier RCA is selectively connected to the transmission case 30 by the second brake B2. The planetary carrier RCA is selectively connected to the input shaft 3a via the second clutch C2. The ring gear RR is connected to the output shaft 3b and integrally rotates along with the output shaft 3b.

The first to fourth clutches C1 to C4, the first brake B1, and the second brake B2 are frictional engagement elements that each engage frictionally by a hydraulic actuator and are controlled by the hydraulic pressure control unit 4 and the ECU 5.

FIG. 3 is an engagement table illustrating engaged states or disengaged states of the first to fourth clutches C1 to C4, the first brake B1, and the second brake B2 for each shift stage (each gear stage). In the engagement table illustrated in FIG. 3, mark O denotes an "engaged state" and a blank denotes a "disengaged state."

As illustrated in FIG. 3, in the automatic transmission 3 according to this example, the first clutch C1 and the second brake B2 each engage to set a first shift stage (1st) having a largest gear ratio (the rotation speed of the input shaft 3a/the rotation speed of the output shaft 3b). The first clutch C1 and the first brake B1 each engage to set a second shift stage (2nd).

The first clutch C1 and the third clutch C3 each engage to set a third shift stage (3rd). The first clutch C1 and the fourth clutch C4 each engage to set a fourth shift stage (4th).

The first clutch C1 and the second clutch C2 each engage to set a fifth shift stage (5th). The second clutch C2 and the fourth clutch C4 each engage to set a sixth shift stage (6th).

The second clutch C2 and the third clutch C3 each engage to set a seventh shift stage (7th). The second clutch C2 and the first brake B1 each engage to set an eighth shift stage (8th). The third clutch C3 and the second brake B2 each engage to set a reverse shift stage (Rev).

The hydraulic pressure control unit 4 controls engagement and disengagement of a plurality of frictional engagement elements (the clutches C1 to C4 and the brakes B1 and B2)

of the automatic transmission 3. The hydraulic pressure control unit 4 also has a function of controlling the lock-up clutch 24 of the torque converter 2. The hydraulic pressure control unit 4 includes a hydraulic actuator of each frictional engagement element of the automatic transmission 3 and a linear solenoid valve that supplies a controlled hydraulic pressure to the hydraulic actuator.

Figure 4:
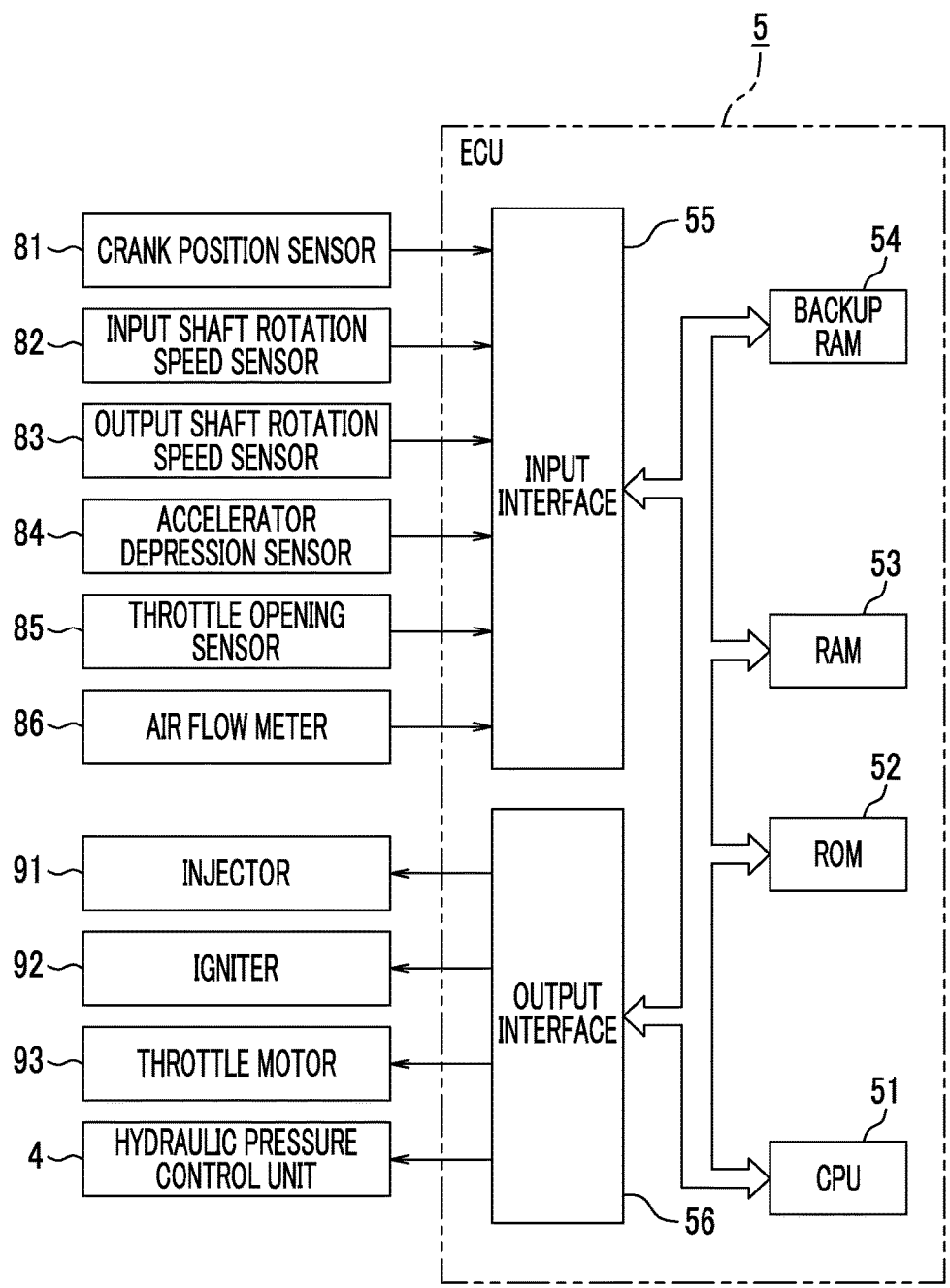
FIG. 4 is a block diagram illustrating a configuration of a control system of the vehicle.

The ECU 5 is configured to perform operation control of the engine 1, gear shift control of the automatic transmission 3, and the like. Specifically, as illustrated in FIG. 4, the ECU 5 includes a CPU 51, a ROM 52, a RAM 53, a backup RAM 54, an input interface 55, and an output interface 56. The ECU 5 is an example of the "electronic control unit" of the disclosure.

The ECU 51 performs an arithmetic process based on various control programs or maps stored in the ROM 52. In the ROM 52, various control programs, maps which are referred to when the control programs are executed, and the like are stored. The RAM 53 is a memory that temporarily stores process results of the CPU 51, detection results of various sensors, and the like. The backup RAM 54 is a nonvolatile memory that stores data to be stored when the ignition is turned off.

The input interface 55 is connected to a crank position sensor 81, an input shaft rotation speed sensor 82, an output shaft rotation speed sensor 83, an accelerator depression sensor 84, a throttle opening sensor 85, an air flow meter 86, and the like.

The crank position sensor 81 is provided to calculate a rotation speed of the engine 1. The input shaft rotation speed sensor 82 is provided to calculate a rotation speed of the input shaft 3a (a turbine rotation speed) of the automatic transmission 3. The output shaft rotation speed sensor 83 is provided to calculate a rotation speed of the output shaft 3b of the automatic transmission 3. A vehicle speed can be calculated from the rotation speed of the output shaft 3b. The accelerator depression sensor 84 is provided to detect a depression amount (an operation amount) of an accelerator pedal. The throttle opening sensor 85 is provided to detect a throttle opening level of a throttle valve. The air flow meter 86 is provided to detect an amount of intake air of the engine 1.

The output interface 56 is connected to an injector 91, an igniter 92, a throttle motor 93, the hydraulic pressure control unit 4, and the like. The injector 91 is a fuel injection valve and can adjust an amount of fuel injected. The igniter 92 is provided to adjust an ignition timing using an ignition plug. The throttle motor 93 is provided to adjust the throttle opening level of the throttle valve.

The ECU 5 is configured to control the operation state of the engine 1 by controlling the throttle opening level, the amount of fuel injected, and the ignition timing, and the like based on detection results of various sensors. The ECU 5 is configured to perform gear shift control of the automatic transmission 3 and control of the lock-up clutch 24 of the torque converter 2 by controlling the hydraulic pressure control unit 4.

In the gear shift control by the ECU 5, a required shift stage is set, for example, based on a gear shift map with the vehicle speed and the accelerator depression amount as parameters, and the hydraulic pressure control unit 4 is controlled such that an actual shift stage is the required shift stage. The gear shift map is a map in which a plurality of areas for calculating an appropriate shift stage (one of the 1st to 8th shift stages having optimal efficiency) are set depending on the vehicle speed and the accelerator depression amount, and is stored in the ROM 52 of the ECU 5. A plurality of shift lines for defining the areas (upshift lines and downshift lines for defining the shift areas of the 1st to 8th shift stages) are set in the gear shift map.

The ECU 5 performs gear shift control corresponding to a degree of progress in gear shift (a degree of progress in gear shift control) based on a target gear shift characteristic value to be described later. The ECU 5 performs power-on upshift control to be described later.

Before describing control (power-on upshift control) by which this embodiment is characterized, gear shift control for determining a control operation amount by which the target gear shift characteristic value (gear shift target value) is realized in the automatic transmission 3 will be schematically described below.

As general gear shift control, for example, a technique of determining a torque capacity (or a hydraulic pressure command value) of each frictional engagement element at a gear shift time and performing a gear shift based on a predetermined control map which has been determined in advance by adaptation while evaluating whether a gear shift shock, a shifting time, or the like is appropriate in an actual vehicle is known. In the technique using the control map, it is necessary to prepare a plurality of control maps depending on a gear shift pattern of a power-on downshift, a power-off upshift, or the like and a combination of shift stages before and after the gear shift. Accordingly, greater labor is required for adaptation work as the number of shift stages of the automatic transmission becomes larger.

Therefore, in this embodiment, a technique of performing a gear shift using a gear shift model for determining a control operation amount by which the target gear shift characteristic value is realized is employed as the gear shift control instead of the technique using the control map. The target gear shift characteristic value is a target value of a factor (such as a shifting time or a driving force) for determining a change in mode to be realized at the time of a gear shift. The control operation amount is a value required during operation for a factor (such as an engine torque or a clutch torque) to reach a control target.

Gear shift control using a gear shift model will be described below. Equations of motion during the gear shift are expressed by Equations (1) and (2).

$$d\omega t/dt = a1 \cdot Tt + b1 \cdot Tcapl + c1 \cdot Tcdrn + d1 \cdot d\omega o/dt \qquad (1)$$

$$To = a2 \cdot Tt + b2 \cdot Tcapl + c2 \cdot Tcdrn + d2 \cdot d\omega o/dt \qquad (2)$$

Equations (1) and (2) are derived from equations of motion of connected rotary elements constituting the automatic transmission 3 and relational expressions of planetary gear mechanisms constituting the automatic transmission 3. The equation of motion of each rotary element is an equation of motion in which a torque which is expressed by a product of a moment of inertia and a rate of change of rotational speed in each rotary element is defined by a torque acting on a member associated with the rotary element among three members of the planetary gear mechanism and both members of each frictional engagement elements. The relational expressions in each planetary gear mechanism are relational expressions in which a torque relationship between three members and a relationship in rotation speed change rate in the planetary gear mechanism are defined using a gear ratio of the planetary gear mechanism.

In Equations (1) and (2), $d\omega t/dt$ is a derivative with respect to time, that is, a change rate, of a turbine rotation speed (a rotational angular velocity) $\omega t$ (that is, an input shaft rotation speed $\omega i$ of the automatic transmission 3) and denotes an acceleration of the input shaft 3a (angular acceleration which is hereinafter referred to as input shaft acceleration) as a change in speed of a rotary member on the input shaft 3a side. The input shaft acceleration $d\omega t/dt$ is an example of the input shaft rotation speed change rate in the disclosure. $d\omega o/dt$ is a change rate of an output shaft rotation speed $\omega o$ of the automatic transmission 3 and denotes an output shaft acceleration. Tt denotes a turbine torque which is a torque on the input shaft 3a as a torque on a rotary member on the input shaft 3a side, that is, a transmission input torque Ti. The turbine torque Tt has the same meaning as an engine torque Te (=Tt/t) in consideration of a torque ratio t of the torque converter 2. To denotes a transmission output torque which is a torque on the output shaft 3b as a torque on a rotary member on the output shaft 3b side. Tcapl denotes a torque capacity of a frictional engagement element that performs an engagement operation at the gear shift time (hereinafter referred to as an engagement-side clutch torque). Tcdrn denotes a torque capacity of a frictional engagement element that performs a disengagement operation at the gear shift time (hereinafter referred to as a disengagement-side clutch torque). Here, a1, a2, b1, b2, c1, c2, d1, and d2 are constants when Equations (1) and (2) are derived and are coefficients which are determined in design from the inertia of the rotary elements and the gear ratio of the planetary gear mechanism. Specific numerical values of the constants vary, for example, depending on a gear shift type (for example, a gear shift pattern or a combination of shift stages before and after gear shift). Accordingly, an equation of motion is individual, but equations of motion corresponding to gear shift types in which the constants differ depending on the gear shift type are used for the gear shift of the automatic transmission 3.

Equations (1) and (2) are gear train equations of motion of the automatic transmission 3 which are obtained by formularizing a relationship between the target gear shift characteristic value and the control operation amount. The target gear shift characteristic values can express target values for the shifting time and the driving force and are handled in the gear train equations of motion. In this embodiment, the input shaft acceleration $d\omega t/dt$ is used as an example of a physical quantity that can express the shifting time. The transmission output torque To is used as an example of a physical quantity that can express the driving force. In this embodiment, the target gear shift characteristic value is set to a target value of the input shaft acceleration $d\omega t/dt$ (the target input shaft rotation speed). The target gear shift characteristic value may be a target value of the shifting time (a target shifting time) or the like.

On the other hand, in this embodiment, the control operation amount of control for establishing the target gear shift characteristic value (feedback control) is set using three values including the turbine torque Tt (which has the same meaning as the engine torque Te), the engagement-side clutch torque Tcapl, and the disengagement-side clutch torque Tcdrn. Thus since the equations of motion includes two equations of Equations (1) and (2) and there are three control operation amounts, there are no unique solutions for the control operation amounts for establishing two target gear shift characteristic values. The output shaft acceleration $d\omega o/dt$ is calculated from the output shaft rotation speed $\omega o$ which is a value detected by the output shaft rotation speed sensor 83.

Therefore, in this embodiment, torque assignment ratios of transmission torques assigned to the disengagement-side clutch and the engagement-side clutch are used as limiting conditions for acquiring solutions to the equations of motion of Equations (1) and (2). By using the torque assignment ratios as the limiting conditions, delivery of a torque (that is, a degree of progress in gear shift) between the disengagement-side clutch and the engagement-side clutch during the gear shift can be incorporated into the equations of motion and the control operation amounts can have unique solutions.

The torque assignment ratios are ratios of the transmission torques at which the total transmission torque on the input shaft is assigned to both frictional engagement elements when the total transmission torque (a total transmission torque) which needs to be assigned to the disengagement-side clutch and the engagement-side clutch during the gear shift of the automatic transmission 3 is replaced with, for example, the torque on the input shaft 3a (the total transmission torque on the input shaft). The torque assignment ratios are changed depending on the degree of progress in gear shift during the gear shift.

In this embodiment, the torque assignment ratio of the engagement-side clutch is defined as "xapl," the torque assignment ratio of the disengagement-side clutch is defined as "xdrn," and Equations (3) and (4) are defined using a torque assignment ratio x (for example, 0≤x≤1) varying in a time series to reflect delivery of a torque during the gear shift.

$$xapl=x \qquad (3)$$

$$xdrn=1-x \qquad (4)$$

The relational expression between the engagement-side clutch torque Tcapl and the disengagement-side clutch torque Tcdrn can be defined using "x" (=xapl) and "1-x" (=xdrn) based on "Tcapl" and "Tcdrn" replaced with the torque on the input shaft 3a and Equations (3) and (4). The relational expression for calculating the turbine torque Tt, the engagement-side clutch torque Tcapl, and the disengagement-side clutch torque Tcdrn which are the control operation amounts is derived from Equations (1) and (2) and the relational expression between "Tcapl" and "Tcdrn." The turbine torque Tt (which has the same meaning as the engine torque Te) is expressed by a relational expression using "x" (=xapl), "1-x" (=xdrn), the input shaft acceleration $d\omega t/dt$, the transmission output torque To, and the like. Similarly, the engagement-side clutch torque Tcapl is expressed by a relational expression using "x" (=xapl), the input shaft acceleration $d\omega t/dt$, the transmission output torque To, and the like. Similarly, the disengagement-side clutch torque Tcdrn is expressed by a relational expression using "1-x" (=xdrn), the input shaft acceleration $d\omega t/dt$, the transmission output torque To, and the like.

That is, a gear shift model in this embodiment is for calculating the control operation amounts based on the target gear shift characteristic values using the equation of motion (Equations (1) and (2)) of the automatic transmission 3 including the target gear shift characteristic values and the control operation amounts and the relationships (Equations (3) and (4)) indicating the torque assignment ratios. In this way, in this embodiment, the gear shift of the automatic transmission 3 is performed using the gear shift model by adding the limiting conditions set with the torque assignment ratio x to the Equations (1) and (2). Accordingly, even when three control operation amounts are present for two target gear shift characteristic values, three control operation amounts can be appropriately determined using the gear shift model. Since an equation of motion is individual but gear train equations of motion in which the constants differ depending on the gear shift type (for example, the gear shift pattern or the combination of shift stages before and after the gear shift) are used as described above, the gear shift models corresponding to the gear shift types are used for the gear shift of the automatic transmission 3.

The ECU 5 calculates the target gear shift characteristic values and the control operation amounts depending on the degree of progress in gear shift for each gear shift pattern. Examples of the gear shift pattern include power-on upshift, power-off upshift, power-on downshift, and power-off downshift.

For example, in a case of the power-on upshift, when hydraulic pressure control for the frictional engagement elements corresponding to a target shift stage is started, the gear shift pattern progresses through a step of torque phase in which the assignment ratios of the required torque capacities of the frictional engagement elements vary, a step of inertia phase in which the gear ratio of the automatic transmission 3 varies, and a step of gear shift end. The gear shift of the automatic transmission 3 progresses through a step before torque phase, the step of torque phase, the step of inertia phase, and the step of gear shift end.

A map or the like in which suitable torque assignment ratios varying with the progress in gear shift are set depending on the degree of progress in gear shift for each gear shift pattern is prepared in advance by experiment, simulation, or the like, and is stored in the ROM 52 of the ECU 5. The ECU 5 reads the torque assignment ratios corresponding to the degree of progress in gear shift at the time of gear shift control, applies the read torque assignment ratios along with the target gear shift characteristic value to the gear shift model, and calculates the control operation amounts (such as a required input torque of the input shaft 3a and required torque capacities of an engagement-side frictional engagement element and a disengagement-side frictional engagement element).

The ECU 5 performs control of the engagement-side frictional engagement element and the disengagement-side frictional engagement element (hydraulic pressure control) depending on the degree of progress in gear shift such that the required torque capacity is obtained. The ECU 5 performs the gear shift control such that the actual input shaft rotation speed reaches the target input shaft rotation speed depending on the degree of progress in gear shift based on the target gear shift characteristic value.

The power-on upshift control which is performed by the ECU 5 will be described below.

When the transmission input torque (hereinafter also referred to as an input torque) increases (increases due to an operation of increasing an amount of accelerator depression amount or the like) during a power-on upshift, there is concern about durability of the frictional engagement elements (such as the clutches and the brakes).

In the related art, it is not possible to cope with such an increase in input torque during the power-on upshift. That is, in the related art, the gear shift mode is changed based on the thermal load states at the gear shift end time of the friction elements which have been predicted before the gear shift starts. Accordingly, when the input torque increases during the power-on upshift, actual thermal loads of the friction elements change to become larger than the thermal loads of the friction elements which have been predicted in the gear shift mode before the gear shift starts and there is concern that durability of the friction elements (the frictional engagement elements) will decrease.

In order to secure durability of the frictional engagement elements, a correction method of shortening the shifting time by increasing an input torque reduction amount or the controlled hydraulic pressure of the frictional engagement elements may be conceived when an increase in input torque is detected during the power-on upshift. However, in this case, additional control such as correction of a target shifting time or prohibition of feedback control is necessary and it is thus difficult to realize stable gear shift control.

In order to solve the above-mentioned problem, in this embodiment, control capable of preventing a decrease in durability of the frictional engagement elements even when the input torque increases due to an operation of increasing an amount of accelerator depression amount or the like during the power-on upshift is realized.

An example of the control (power-on upshift control) will be described below with reference to the flowchart illustrated in FIG. 5 and the timing chart illustrated in FIG. 6. The control routine illustrated in FIG. 5 is repeatedly performed at predetermined intervals by the ECU 5.

Figure 5:
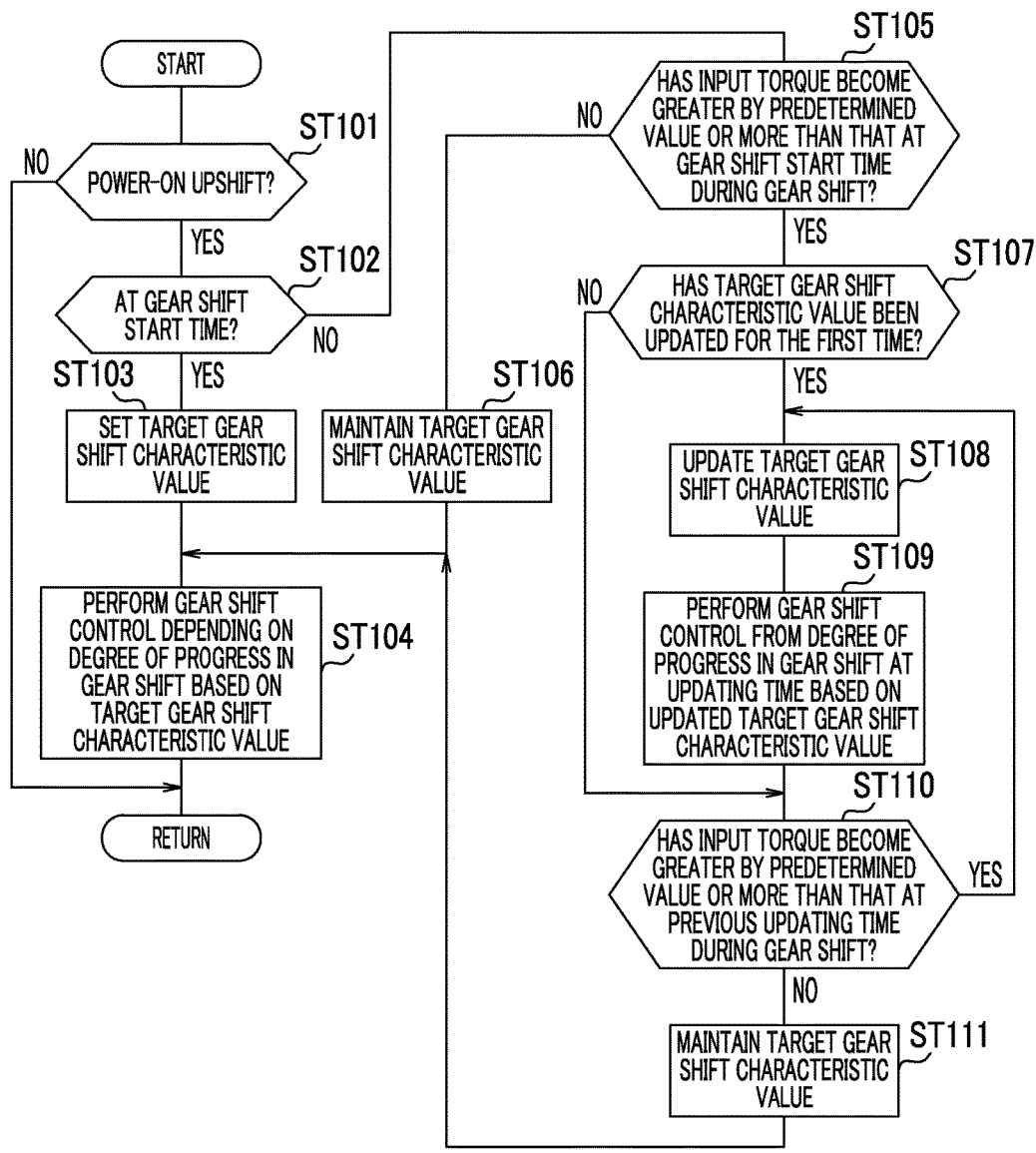
FIG. 5 is a flowchart illustrating an example of power-on upshift control which is performed by an electronic control unit.

While performing the control routine illustrated in FIG. 5, the ECU 5 sequentially calculates the input torque of the automatic transmission 3. Specifically, the ECU 5 calculates an engine torque based on an amount of intake air acquired from an output signal of the air flow meter 86, the ignition timing of the engine 1, or the like, and calculates the input torque by multiplying the calculated engine torque by a torque ratio t of the torque converter 2. Regarding the input torque, a torque sensor may be disposed in the crank shaft 1a of the engine 1 or the input shaft 3a of the automatic transmission 3 and the input torque may be calculated based on an output signal of the torque sensor.

When the control routine illustrated in FIG. 5 starts, it is determined in Step ST101 whether a gear shift request of the automatic transmission 3 has been given and whether the gear shift is a power-on upshift. When the determination result is negative (NO), the control routine restarts. When the determination result of Step ST101 is positive (YES), the control routine transitions to Step ST102.

In Step ST102, it is determined whether a gear shift start time has been reached. When the determination result is positive (YES) (when it is determined that the gear shift start time has been reached), the control routine transitions to Step ST103. When the determination result of Step ST102 is negative (NO), the control routine will be described later.

In Step ST103, the target gear shift characteristic value at the gear shift start time is set. Setting of the target gear shift characteristic value will be described below.

In this embodiment, a target value of the input shaft acceleration dωt/dt (target input shaft acceleration) in Equation (1) of the equation of motion is set as the target gear shift characteristic value. The target input shaft acceleration is set depending on vehicle conditions. Specifically, the target input shaft acceleration is set with reference to the target input shaft acceleration map based on the input torque and the vehicle speed (which is calculated from the output signal of the output shaft rotation speed sensor 83) at the gear shift start time. The target input shaft acceleration map is a map in which the target input shaft acceleration required depending on the input torque and the vehicle speed is set in advance by experiment, simulation, or the like using the input torque and the vehicle speed indicating the vehicle conditions as parameters, and is stored in the ROM 52 of the ECU 5. Hereinafter, the target input shaft acceleration is referred to as a target gear shift characteristic value.

Then, in Step ST104, the gear shift control (the power-on upshift control) corresponding to the degree of progress in gear shift is performed based on the target gear shift characteristic value (the target gear shift characteristic value corresponding to the input torque at the gear shift start time) set in Step ST103. Thereafter, the control routine restarts.

On the other hand, when the determination result of Step ST102 is negative (NO), it is determined that the gear shift of the power-on upshift is being performed and the control routine transitions to Step ST105.

In Step ST105, it is determined whether the input torque has become greater by a predetermined value (Tht) or more than the input torque at the gear shift start time during the gear shift. Specifically, an increase in input torque ΔTi with respect to the gear shift start time t1 illustrated in FIG. 6 is equal to or greater than the predetermined value Tht.

Regarding the predetermined value Tht which is used for determination of Step ST105, for example, when the input torque increases during the power-on upshift, an increase in input torque (the increase in input torque from that at the gear shift start time) in which an increase in thermal load affects durability of the frictional engagement elements is calculated in advance by experiment, simulation, or the like and a value obtained by adding a margin to the increase in input torque (an allowable value) in which the increase in thermal load affects durability of the frictional engagement elements when the input torque increases during the power-on upshift is set as the predetermined value Tht based on the result thereof.

When the determination result of Step ST105 is negative (NO) (when ΔTi<Tht is satisfied, where ΔTi is the increase in input torque from that at the gear shift start time), the target gear shift characteristic value is maintained (Step ST106) and the control routine returns to Step ST104. In Step ST104, the gear shift control corresponding to the degree of progress in gear shift is performed based on the maintained target gear shift characteristic value. Thereafter, the control routine restarts.

On the other hand, when the determination result of Step ST105 is positive (YES), that is, when the increase in input torque ΔTi from that at the gear shift start time is equal to or greater than the predetermined value Tht, the control routine transitions to Step ST107.

In Step ST107, it is determined whether the target gear shift characteristic value has been updated for the first time. When the determination result is positive (YES) (when the target gear shift characteristic value is updated for the first time), the control routine transitions to Step ST108. When the determination result of Step ST107 is negative (NO) (when the target gear shift characteristic value is updated at the second time or later), the control routine transitions to Step ST110.

In Step ST108, a time point at which the determination result of Step ST105 is positive (YES), that is, a time point at which the increase in input torque ΔTi from that at the gear shift start time is equal to or greater than the predetermined value Tht (time point t2 in FIG. 6) is used as an updating time and the target gear shift characteristic value is updated.

Figure 6:
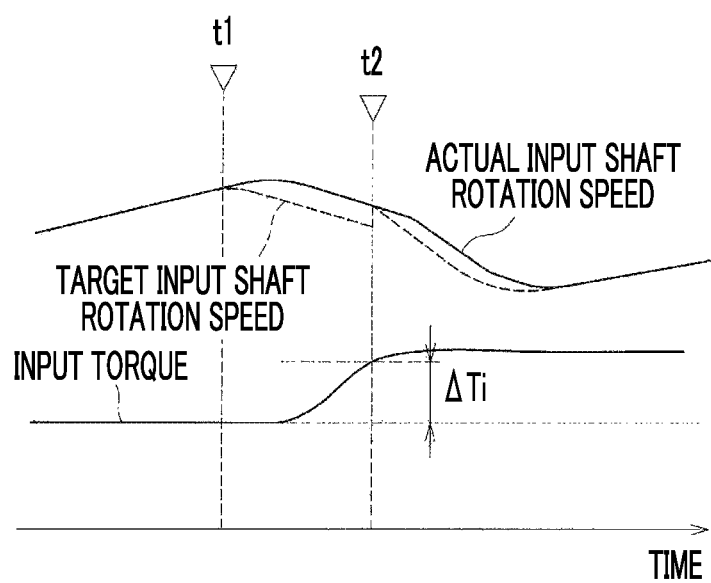
FIG. 6 is a timing chart illustrating an example of a change in a target input shaft rotation speed, an actual input shaft rotation speed, and an input torque when the power-on upshift control is performed.

The updating of the target gear shift characteristic value in Step ST108 is performed based on the input torque at the updating time (time point t2 in FIG. 6). Specifically, the target gear shift characteristic value is updated in a process of updating the target gear shift characteristic value to a target gear shift characteristic value in the gear shift control (a target input shaft acceleration which is acquired in the same process as in Step ST103) which is performed when the gear shift starts with the input torque at the updating time (a high input torque). By updating the target gear shift characteristic value in this way, the same control as the gear shift control starting in a stable input torque state on a high torque side can be performed for the correction function such as feedback control.

In Step ST109, the gear shift control is performed from the degree of progress in gear shift at the updating time based on the target gear shift characteristic value updated in Step ST108. For example, when the target gear shift characteristic value is updated at the degree of progress in gear shift of 50%, the gear shift control starts at the time point at which the degree of progress in gear shift is 50% based on the target gear shift characteristic value at the degree of progress in gear shift of 50% (the target gear shift characteristic value after being updated).

Then, in Step ST110, it is determined whether the input torque has become greater by the predetermined value (Tht) or more than that at the previous updating time during the gear shift (one instance of gear shift) (it is determined whether the increase in input torque from that at the updating time is equal to or greater than the predetermined value Tht). The predetermined value Tht which is used for the determination of Step ST110 is assumed to be the same as the value used for the determination of Step ST105.

When the determination result of Step ST110 is positive (YES), that is, when the input torque has increased further after the target gear shift characteristic value was updated during one instance of gear shift and the input torque becomes greater by the predetermined value (Tht) or more than that at the updating time (at the previous updating time) (when "the increase in input torque from that at the previous updating time≥Tht" is satisfied), the control routine returns to Step ST108 and the target gear shift characteristic value is re-updated. Specifically, the target gear shift characteristic value is updated in a process of updating the target gear shift characteristic value to a target gear shift characteristic value in the gear shift control (a target input shaft acceleration which is acquired in the same process as in Step ST103) which is performed when the gear shift starts with the input torque at the re-updating time (a high input torque). Then, in Step ST109, the gear shift control is performed from the degree of progress in gear shift at the re-updating time based on the target gear shift characteristic value re-updated in Step ST108.

The re-updating process and the gear shift control process (the processes of Step ST110 and Steps ST108 to ST109) described above may be performed multiple times during one instance of gear shift.

On the other hand, when the determination result of Step ST110 is negative (NO) (when "the increase in input torque from that at the previous updating time<Tht" is satisfied), the target gear shift characteristic value is maintained (Step ST111) and the control routine returns to Step ST104. In Step ST104, the gear shift control corresponding to the degree of progress in gear shift is performed based on the maintained target gear shift characteristic value. Thereafter, the control routine restarts.

By causing the ECU 5 to perform the processes of Steps ST101 to ST111 in FIG. 5, the "controller for an automatic transmission" in the disclosure is embodied.

As described above, according to this embodiment, when the input torque becomes greater by a predetermined value or more than that at the gear shift start time due to an operation of increasing an amount of accelerator depression amount or the like during the power-on upshift, the target gear shift characteristic value is updated based on the input torque at that time, and the gear shift control is performed from the degree of progress in gear shift at the updating time based on the updated target gear shift characteristic value. Since the target gear shift characteristic value can be changed with respect to the increase in the input torque during the power-on upshift by this control, it is possible to decrease thermal loads of the frictional engagement elements (such as the clutches and the brakes). Accordingly, it is possible to prevent a decrease in durability of the frictional engagement elements.

In this embodiment, when the input torque becomes greater by the predetermined value or more than that at the updating time after the target gear shift characteristic value has been updated during one instance of gear shift of the automatic transmission 3, the target gear shift characteristic value is re-updated and the gear shift control is performed from the degree of progress in gear shift at the re-updating time based on the re-updated target gear shift characteristic value. By this control, when the increase in input torque during the power-on upshift is large, the target gear shift characteristic value is updated multiple times during one instance of power-on upshift (during the gear shift). Accordingly, for example, even when the amount of operation of increasing an amount of accelerator depression amount is large during the power-on upshift and the increase in input torque is large, it is possible to prevent an increase in thermal load of each frictional engagement element during the power-on upshift and to prevent a decrease in durability of the frictional engagement elements.

The above-disclosed embodiment is exemplary in all respects and is not based on restrictive analysis. The technical scope of the disclosure is not construed by only the above-mentioned embodiment, and is defined by the description of the appended claims. The technical scope of the disclosure includes all modifications within a meaning and a range equivalent to the disclosure.

The above-mentioned embodiment describes an example in which the disclosure is applied to the power-on upshift control, but the disclosure is not limited thereto. For example, the disclosure can be applied to control when an input torque increases during a gear shift in another gear shift control.

The above-mentioned embodiment describes an example in which the disclosure is applied to the control of the automatic transmission 3 with eight forward stages, but the disclosure is not limited thereto. The disclosure can be applied to control of an automatic transmission with seven or less forward stages or nine or more forward stages.

The above-mentioned embodiment describes an example in which the vehicle 100 is of an FF type, but the disclosure is not limited thereto. The vehicle may be of a front engine-rear drive (FR) type or of a four-wheel driven type.

The above-mentioned embodiment describes an example in which the engine 1 is a multi-cylinder gasoline engine, but the disclosure is not limited thereto. The engine may be a diesel engine or the like.

In the above-mentioned embodiment, the ECU 5 may be constituted by a plurality of ECUs.

The disclosure can be effectively used for a controller for a stepped automatic transmission in which a plurality of shift stages are set by selectively causing a plurality of frictional engagement elements to engage with each other.

What is claimed is:

1. A controller for a stepped automatic transmission that includes a plurality of frictional engagement elements that are each selectively switched between engaged and disengaged states to selectively establish a plurality of shift stages, the controller comprising:
    an electronic control unit configured to:
        (i) perform gear shift control when performing a gear shift operation between different ones of the plurality of shift stages, the gear shift control being based on a target gear shift characteristic value determined based on an input torque of the automatic transmission at a gear shift start time; and
        (ii) update the target gear shift characteristic value during the gear shift operation when the input torque increases during the gear shift operation to a first torque value that is greater by a predetermined value than the input torque that existed at the gear shift start time, wherein
    the target gear shift characteristic value is updated to a first updated target gear shift characteristic value that is determined based on the first torque value, and
    the gear shift control is continued based on the first updated target gear shift characteristic value from a first updating time at which the input torque was determined to have become the first torque value.

2. The controller according to claim 1, wherein the electronic control unit is configured so that when the input torque is determined to have further increased to a second torque value that is greater by the predetermined value than the first torque value that existed at the first updating time, the electronic control unit;
    (iii) updates the target gear shift characteristic value to a second updated target gear shift characteristic value that is determined based on the second torque value; and
    (iv) continues to perform the gear shift control based on the second updated target gear shift characteristic value from a second updating time at which the input torque was determined to have become the second torque value.

* * * * *